Figure 1:
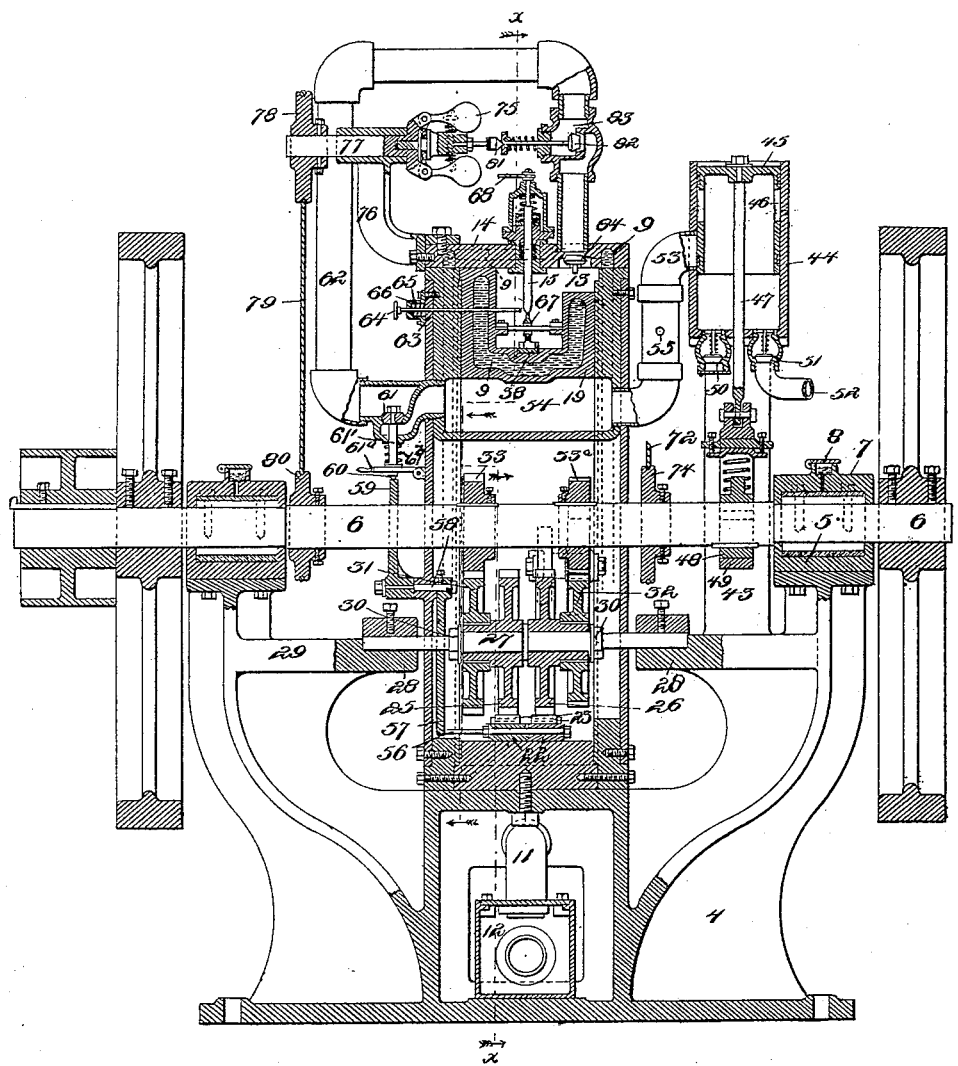

No. 623,361. Patented Apr. 18, 1899.
J. H. FREW.
OSCILLATING GAS OR STEAM ENGINE.
(Application filed Oct. 2, 1897.)
(No Model.) 3 Sheets—Sheet 1.

Witnesses
J. P. Appleman.
J. A. M. Wilson

Inventor
J. H. Frew.
by Henry C. Evert
Attorney

No. 623,361. Patented Apr. 18, 1899.
J. H. FREW.
OSCILLATING GAS OR STEAM ENGINE.
(Application filed Oct. 2, 1897.)
(No Model.) 3 Sheets—Sheet 2.
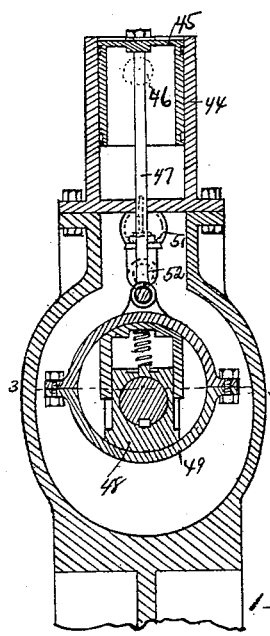
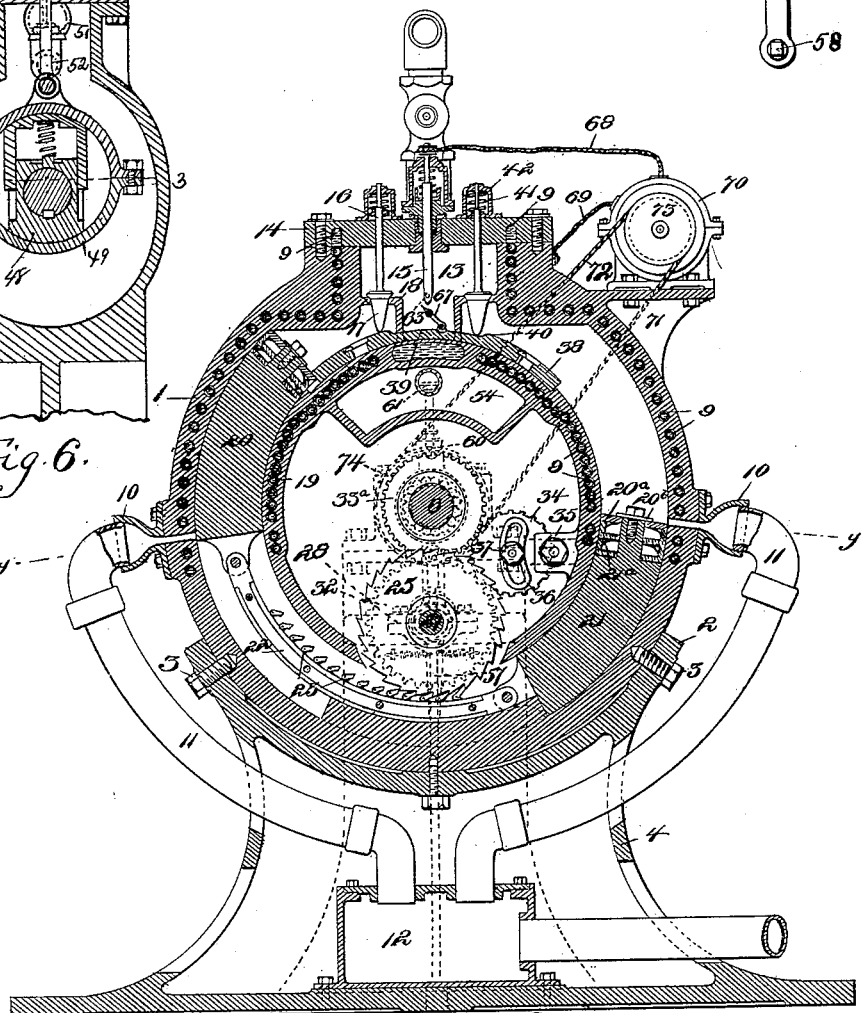
Witnesses
J. P. Appleman.
A. M. Wilson.
Inventor
J. H. Frew.
by Henry C. Evert
Attorney No. 623,361. Patented Apr. 18, 1899.
J. H. FREW.
OSCILLATING GAS OR STEAM ENGINE.
(Application filed Oct. 2, 1897.)
(No Model.) 3 Sheets—Sheet 3.
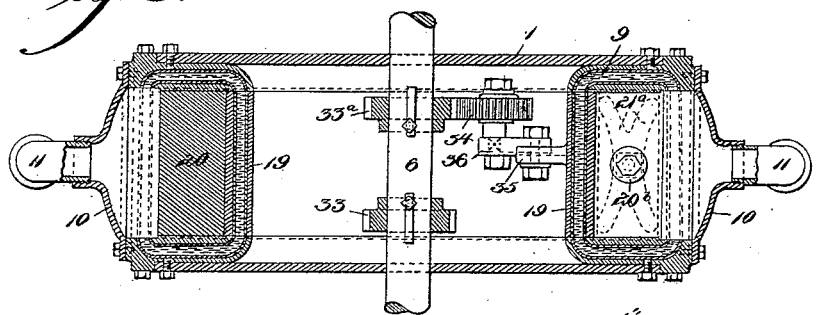
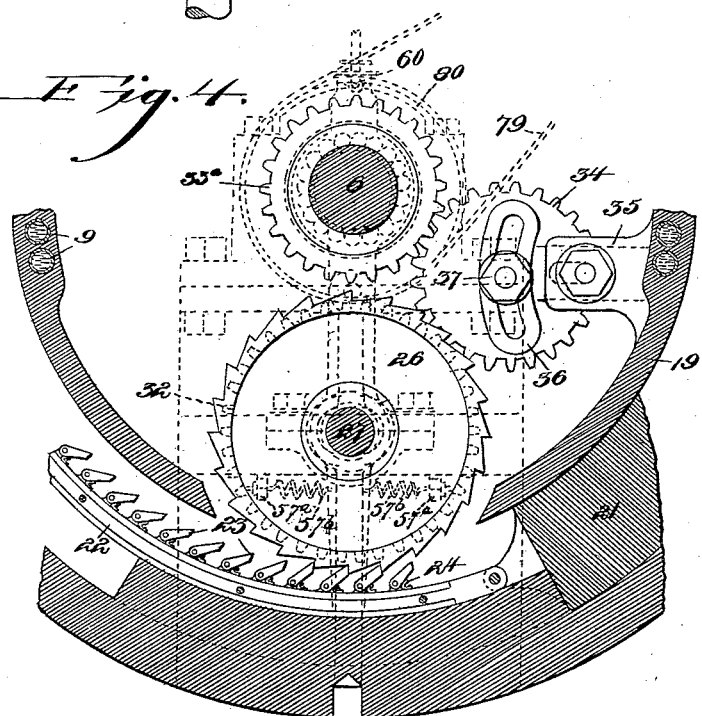
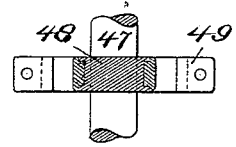
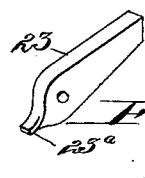
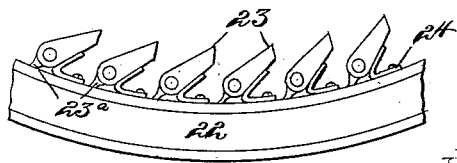
Witnesses
J. P. Hopleman
A. M. Wilson
Inventor
J. H. Frew.
by Henry E. Everett
Attorney
THE NORRIS PETERS CO., PHOTO-LITHO., WASHINGTON, D. C.

UNITED STATES PATENT OFFICE.

JAMES H. FREW, OF NEW CASTLE, PENNSYLVANIA.

OSCILLATING GAS OR STEAM ENGINE.

SPECIFICATION forming part of Letters Patent No. 623,361, dated April 18, 1899.

Application filed October 2, 1897. Serial No. 653,777. (No model.)

*To all whom it may concern:*

Be it known that I, JAMES H. FREW, a citizen of the United States of America, residing at New Castle, in the county of Lawrence and State of Pennsylvania, have invented certain new and useful Improvements in Oscillating Gas or Steam Engines, of which the following is a specification, reference being had therein to the accompanying drawings.

This invention relates to certain new and useful improvements in gas-engines, and has for its object to improve the construction of such engines so as to render the same more efficient and certain in their operation.

A further object of my invention is to supply and retain at all times an equal and sufficient amount of gas for the operation of the engine.

A still further object of the invention is to construct an engine wherein a charge of gas will be stored in the explosion-chamber when the engine is stopped, so as to have the same in position for starting the engine; and the invention further resides in the novel arrangement of the various parts to be hereinafter more fully described, and specifically pointed out in the claims.

In describing the invention in detail reference is had to the accompanying drawings, forming a part of this specification, and wherein like numerals of reference indicate similar parts throughout the several views, in which—

Figure 1 is a vertical sectional view of my improved engine. Fig. 2 is a section on line X X of Fig. 1. Fig. 3 is a horizontal section taken on line Y Y of Fig. 2. Fig. 4 is a detail sectional view showing the oscillating rack and driving mechanism. Fig. 5 is a detail view of a portion of the rack. Fig. 6 is a vertical sectional view of the pump. Fig. 7 is a sectional view on line Z Z of Fig. 6. Fig. 8 is an enlarged detail perspective view of one of the spring-pawls. Fig. 9 is a sectional view of the exhaust-box. Fig. 10 is a plan view of the lever which opens valve to admit the charge from the storage-chamber to the explosion-chamber.

Referring now to the drawings by reference-figures, 1 denotes the cylinder, mounted upon a suitable support 2 and which is or may be secured thereto by bolts or rivets 3. Said support is provided with suitable brackets 4, which carry the bearings 5, adapted to receive the driving-shaft 6, said bearings having a suitable lining of metal 7 and being provided with oil-cups 8. The cylinder, as shown, is substantially circular in cross-section, and the casing thereof is provided with a water-jacket formed by casting a pipe or tube 9 within the casing, said pipe or tube being so arranged as to carry the water around the body of the cylinder.

The cylinder 1 is provided with exhaust-ports 10, which communicate with pipes 11, leading to an exhaust-box 12, to be hereinafter more fully described. The cylinder 1 is also provided at its top with a longitudinal opening 13, forming the explosion-chamber, which is closed by a plate 14, rigidly secured in any suitable manner to the shell or casing of the cylinder. This plate 14, while forming the cover of the explosion-chamber, also supports the electrode 15 of igniter and further supports the stems 16 of the automatically and alternately operated valves 17, which rest normally on the valve-seats 18, supported from the inner casing 19 and from the outer casing 1. This inner casing 19 forms a bearing for the pistons or plungers 20 21, which operate in the cylinder with alternate relation to each other, so that when the plunger 20 is moving downward the plunger 21 is moving upward, and vice versa, as will be hereinafter more fully described. These plungers 20 21 move in a semicircular path of travel and are connected together by two segmental-shaped links 22, carrying a series of pawls 23, pivotally secured thereon in an inclined position, with the pawls on one link pointing in the opposite direction from those on the twin link. These pawls are provided on their pivoted end with a projection 23ª, adapted to engage against the link when the pawls are in engagement and hold the same in the engaging position, into which they are forced by means of springs 24, arranged between the pawls and the link. These pawls 23 are adapted to engage ratchet-wheels 25 26, which are mounted upon a shaft 27, supported in bearings 28, carried by arms 29, projecting from the braces 4. These ratchet-wheels are formed with extended hubs 30, upon which are mounted, within the cylinder, gear-wheels 31 32, the gear 31 engaging and meshing with a gear 33, mounted within the cylinder upon the driving-shaft 6, while the gear 32 meshes with an intermediate gear 34, supported by a bracket 35 from the inner casing 19, said gear transmitting the movement to the gear 33ª when the piston or plunger 21 is on the downward stroke and the piston or plunger 20 operating the gear 33 to revolve the driving-shaft in the same direction on the downward movement of said plunger 20. This intermediate gear 34 is provided with an adjusting-link 36 and nut 37. (Shown in Figs. 2 and 4 of the drawings.)

Arranged on top of the inner casing or wall 19 is the valve-operating slide 38, formed with a cut-away portion 39, having inclined shoulders 40, by means of which the valves 17 are alternately opened and closed. The plungers 20 21 are provided with a number of packing-plates 20ª, held in position by means of spring-plates 21ª and fastened by a binding-plate 20ᵇ, held by a set-screw 21ᵇ, engaging the plungers 20 and 21. As these plungers alternately engage the valve-operating slide 38, they alternately open the valves 17 by reason of their engagement with the inclined shoulders 40, said valves being closed by the springs 41, arranged within the casings 42 on the plate 14.

The arm 29 supports a bracket 43, upon which the air-and-gas-mixing cylinder 44 is supported. The piston 45, operating within this cylinder, is provided with a port 46 and the piston-rod 47, which is connected by an eccentric to the driving-shaft 6. This cam connection consists of an eccentric-cam 48, mounted upon the driving-shaft and rigidly secured thereto and operating within a yoke 49, inclosing the same and to which the piston-rod 47 is connected.

Arranged in the base of the cylinder 44 is an air-inlet valve 50 and a gas-inlet valve 51, to which latter is connected the gas-supply pipe 52. Connected to this cylinder 44 is the gas-and-air-inlet pipe 53, which conducts the gas and air from the cylinder to the storage-chamber 54, and in order to determine from the color of the flame whether the gas and air have been mixed in the proper proportions I have provided the pipe 53 with a testing-tube 55, at which the gas may be ignited for this purpose.

Attached to the left side, as shown in Fig. 1, of the segmental-shaped link 22 are pins 56, which are adapted to engage and operate a lever 57, which straddles the shaft 27 and is rigidly secured to a bolt 58, passing through the casing of the cylinder and having secured thereto an oscillating lever 59, having a convexed end 60, which engages the pointed end of valve-stem 61' and lifts the valve 61 to admit the mixed air and gas from the storage-chamber 54 through the pipe 62 into the explosion-chamber 13.

For the purpose of producing the spark to cause the first explosion I have provided in the casing of the cylinder a rod 63, extending into the explosion-chamber 13 and adapted to form a contact with the electrode 15, said rod carrying a knob or button 64 on its outer end and being held normally out of engagement with the electrode by means of a spring 65, arranged on the rod within the casing 66, provided therefor on the casing of the cylinder. After the first explosion the succeeding ones are produced by means of the contact-pin 67, operated by the valve-operating slide 38, on which the same is carried, each movement of this slide forcing the contact-pin into engagement with the electrode 15, the spark being produced by the separation of the electrodes. The circuit is completed through the electrode and contact-pin by means of wires 68 and 69, connected to a dynamo 70, suitably supported by a bracket 71 on the cylinder-casing or located at any desired point and operated by a band or belt 72, engaging a pulley 73 on the dynamo and pulley 74 on the driving-shaft 6.

To regulate the speed of the engine, I provide a governor 75, journaled in an arm 76, secured on the plate 14. To the shaft 77 of this governor is attached a pulley 78, connected by belt 79 to a pulley 80 on the driving-shaft 6, the stem 81 of said governor being connected to a valve 82, having a seat within a chamber 83 in the inlet-pipe 62.

The escape of gas from the explosion-chamber is prevented by means of a valve 84, arranged in the outlet of the pipe 62.

In order to deaden the sound of the exhaust, I have provided for this purpose the box 12, which is preferably arranged beneath the engine, though the same may be at any desired point, the pipes 11 leading into this box, which is partly filled with water, so that the exhaust will occur below the surface of the water, from whence the fumes arise and escape through the outlet-pipe 11ª, arranged at any suitable point.

To admit the first charge of gas and air from the storage-chamber to the explosion-chamber, the valve 61 is operated by means of the hand-lever 61ª, by which the valve is raised, said valve being operated thereafter by means of the mechanism heretofore described.

Operation: When the first charge of gas has been admitted by the hand-lever 61ª, the igniting-rod 63 is forced into engagement with the electrode 15, the separation of the same producing the spark, and the valve 17 being open, as shown in Fig. 2, the explosion forces the plunger downward, causing the pawls on the segmental link (shown in this view) to engage the ratchet-wheel 25, revolving the same and communicating motion through the connections heretofore described to the driving-shaft 6. Simultaneously with the downward movement of the plunger 20 the opposite plunger 21 is moving upward and coming in contact with the valve-operating slide 38 operates the same, so as to open the valve-controlling plunger 21 and close the valve-controlling plunger 20, and at the same time producing the spark for the succeeding explosion by bringing the contact-pin 67 into engagement with the electrode 15 and then separating them. As this plunger 21 is forced downward by the explosion the segmental link 22 engages the ratchet-wheel 26 and through the gear connections heretofore described imparts the same motion to the driving-shaft 6 as is imparted to it by the downward movement of the plunger 20. These plungers are thus alternately forced downward each to a point past its respective exhaust and serve to operate, through the connections heretofore described, the lever 59 to automatically open the valve 61 and admit the charge of gas properly mixed with air from the storage-chamber to the explosion-chamber, said valve being automatically closed after the lever passes from engagement therewith by means of a spring 61$^b$, arranged on the valve-stem between the lever 61$^a$ and the casing around the valve-seat. This operation taking place just previous to the time the plunger passes the exhaust-port admits the new charge of gas into the cylinder before the opposite plunger closes the valve from the explosion-chamber. The operation of the other plunger being exactly the same, one moving downward serves to move the other upward, compressing the gas, thus serving to form a cushion and lessen the quick jar of the explosion. The oscillating lever 57 has attached thereto and to lugs 57$^a$, cast on the interior portion of the wall, springs 57$^b$, which serve to return this lever to its perpendicular position after having been operated to admit the charge of gas, as heretofore stated. The charge of gas enters the explosion-chamber through the check-valve 84, which has a downward motion, closing when the charge has been admitted, and when the explosion occurs, the valve being closed, any back explosion of the gas is prevented.

The pump-operating mechanism attached to the main shaft operates the pump, and this pump being provided with the air-valve 50 and gas-valve 51 the air and gas are pumped into the cylinder and forced into the storage-chamber in the proper proportions, and to determine if the same are properly mixed for perfect combustion the gas may be ignited at the testing-tube 55. By means of the pump-operating mechanism, the spring of which is set to a tension equal to the pounds pressure desired in the storage-chamber, the pump will continue to operate to force the gas and air into the said chamber until the pressure of the gas and air and the tension of the spring are equal, at which time the cam will be concentrically mounted upon the driving-shaft and the pump will cease its operation.

A suitable battery is attached to the dynamo and is charged by the extra electricity generated by the dynamo and is employed for producing the first spark necessary for starting the engine.

I desire to call attention to the fact that a charge of gas is always ready for the starting of the engine, and after the first explosion has been made with the assistance of the hand-igniter the operation is entirely automatic throughout; and I also desire to call attention to the fact that by the arrangement of the cam-governor a uniform pressure of gas is retained at all times within the storage-chamber.

It will also be noted that various changes may be made throughout the details of construction without departing from the general spirit of my invention.

Having fully described my invention, what I claim as new, and desire to secure by Letters Patent, is—

1. In a gas-engine, the combination with a cylinder, of two plungers reciprocating therein, segmental links connecting said plungers, ratchet-wheels turning in opposite directions and engaging said segmental links, a driving-shaft, and connections between the ratchet-wheels and the driving-shaft whereby motion in one direction is transmitted to the driving-shaft, substantially as shown and described.

2. In a gas-engine the combination of an inner and an outer casing forming working cylinders, plungers reciprocating in said cylinders, segmental-shaped links connecting said plungers, an explosion-chamber, valves controlling the direction of the force of the explosion, ratchet-wheels operating in opposite directions and engaging said segmental links, a driving-shaft, pinions 31 and 33 connecting one of said ratchet-wheels to the driving-shaft, pinions 32 and 33$^a$ connecting the other of said ratchet-wheels to the driving-shaft and an intermediate gear 34 whereby continuous motion in one direction is imparted to the driving-shaft, substantially as herein shown and described.

3. In a gas-engine, the combination of working cylinders, plungers operating in said cylinders, a valve-controlling slide, an explosion-chamber, valves controlling the admission of the exploded charge to the working cylinders, and being opened by said slide, said plungers being alternately operated against the ends of the slide, substantially as shown and described.

4. In a gas-engine, the combination of the working cylinders, a storage-chamber, an explosion-chamber, valves controlling the admission of gas to the working cylinders, a valve-operating slide, plungers operating in the working cylinders and alternately operating against the ends of the said slide, segmental links connecting said plungers, and connections between said links and the drive-shaft for communicating motion to the same, substantially as shown and described.

5. The combination in a gas-engine, of a storage-chamber, an explosion-chamber communicating therewith, an electrode projecting into said explosion-chamber, working cylinders, plungers operating therein, valves located between said explosion-chamber and said working cylinders, a valve-operating slide, exhaust-ports formed in the working cylinders, an electrode mounted on said valve-operating slide, said plungers operating alternately against the ends of said slide whereby the electrodes are brought into contact and separated to produce a spark, substantially as shown and described.

6. The combination in a gas-engine, of the working cylinders, plungers operating in said cylinders, segmental links connecting said plungers, pawls secured to said links, ratchet-wheels engaged by said pawls, a drive-shaft, connections between said ratchet-wheels and the drive-shaft, valves controlling the admission of the exploded charge to the working cylinders, a valve-operating slide, an electrode pivotally mounted on said slide, an explosion-chamber, an electrode projecting into said chamber, the aforesaid plungers alternately operating against the ends of the valve-operating slide whereby the electrodes are brought into contact and separated to produce a spark, substantially as shown and described.

7. A gas-engine having two water-jacketed casings forming working cylinders, plungers operating in said cylinders, segmental links connecting said plungers, an explosion-chamber, a storage-chamber, a valve-controlling slide, the aforesaid plungers alternately operating against the ends of the valve-operating slide to automatically open the valves to allow the passage of the exploded charge from the explosion-chamber to the working cylinders, and means within said explosion-chamber whereby the mixture is ignited, substantially as shown and described.

8. In a gas-engine, the combination of two working cylinders, plungers operating in said cylinders, segmental links connecting said plungers, spring-actuated pawls secured to said links, ratchet-wheels engaging said pawls, a drive-shaft, connections between the drive-shaft and ratchet-wheels, said ratchet-wheels revolving in opposite directions and communicating continuous motion to the drive-shaft in one direction, substantially as described.

9. In a gas-engine the combination of the working cylinders, a storage-chamber, an explosion-chamber, valves controlling the admission of the explosive mixture to the explosion-chamber, valves controlling the admission of gas to the working cylinders, a valve-operating slide, plungers operating in the working cylinders and alternately operating against the ends of the said slide, links connecting said plungers, a drive-shaft, and connections between said links and the drive-shaft for communicating motion to said shaft, substantially as shown and described.

10. A gas-engine having two water-jacketed casings forming working cylinders, plungers operating in said cylinders, segmental links connecting said plungers, a water-jacketed explosion-chamber, a storage-chamber, a valve-controlling slide, the aforesaid plungers alternately operating against the ends of the valve-operating slide to automatically open the valves to allow the passage of the exploded charge from the explosion-chamber to the working cylinders, and means within said explosion-chamber whereby the mixture is ignited, substantially as shown and described.

11. A gas-engine having two water-jacketed casings forming working cylinders, plungers operating in said cylinders, segmental links connecting said plungers, an explosion-chamber, a storage-chamber, a drive-shaft, a pump connected to the drive-shaft and storage-chamber, a valve-controlling slide, the aforesaid plungers operating alternately against the ends of the valve-controlling slide to automatically open the valves to allow the passage of the exploded charge from the explosion-chamber to the working cylinders, and means within said chamber whereby the mixture is ignited, substantially as shown and described.

In testimony whereof I affix my signature in presence of two witnesses.

JAMES H. FREW.

Witnesses:
 JOHN NOLAND,
 GEO. B. PARKER.